US008284184B2

(12) United States Patent
Dou

(10) Patent No.: US 8,284,184 B2
(45) Date of Patent: Oct. 9, 2012

(54) METHOD AND DEVICE FOR AVOIDING IMAGE STICKING

(75) Inventor: Fang Dou, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 1168 days.

(21) Appl. No.: 12/128,708

(22) Filed: May 29, 2008

(65) Prior Publication Data

US 2009/0079724 A1 Mar. 26, 2009

(30) Foreign Application Priority Data

Sep. 26, 2007 (CN) .......................... 2007 1 0122506

(51) Int. Cl.
*G06F 3/038* (2006.01)

(52) U.S. Cl. .............. 345/212; 345/87; 345/88; 345/89; 345/94; 345/98

(58) Field of Classification Search .......... 345/208–210, 345/89–104
See application file for complete search history.

(56) References Cited

U.S. PATENT DOCUMENTS 5,748,171 A * 5/1998 Ishizaki et al. ................ 345/101
7,050,027 B1 * 5/2006 Macrae ........................... 345/87

FOREIGN PATENT DOCUMENTS

CN 1908741 2/2007
JP 1-94324 A 4/1989
JP 6-194622 A 7/1994
JP 7/318901 A 12/1995
JP 2002-149123 5/2002
JP 2002-236476 8/2002
JP 2004-361429 12/2004
JP 2005-128101 A 5/2005
JP 2006-154545 A 6/2006

OTHER PUBLICATIONS

Patent Abstracts of Japan English abstract of JP 1-94324.
English abstract and JPO computer English translation of JP 2002-236476 dated Aug. 23, 2002.
English abstract of CN 1908741 dated Feb. 7, 2007.

* cited by examiner

*Primary Examiner* — Alexander S Beck
*Assistant Examiner* — Amen Bogale
(74) *Attorney, Agent, or Firm* — Ladas & Parry LLP

(57) ABSTRACT

The present invention directs to a method an device for avoiding image sticking, the method for avoiding image sticking is to adjust a real common electrode voltage by difference between the real common electrode voltage and an ideal common electrode voltage, said difference is obtained by acquiring a real pixel electrode voltage on a panel; the device comprises a difference generation block for generating the difference between the real common electrode and the ideal common electrode voltage and an adjusting block for adjusting the real common electrode voltage, said adjusting block comprises an enabling block for generating a common electrode voltage adjustor enabling signal, a control block for generating a common electrode voltage adjustor control signal, and a common electrode voltage adjustor for adjusting the real common electrode voltage. With the method and device of the present invention, the coupling voltage's influence on a pixel electrode can be eliminated, and image sticking can be alleviated or avoided, and no impact on flicker is generated.

9 Claims, 5 Drawing Sheets

METHOD AND DEVICE FOR AVOIDING IMAGE STICKING

TECHNICAL FIELD

The present invention directs to a circuit and a panel portion of liquid crystal display, in particular, to a method and a device for avoiding image sticking, which are capable of dynamically adjusting a real common electrode voltage.

BACKGROUND ART

A thin film transistor active matrix liquid crystal display (TFT-LCD) is a advanced product in the current liquid crystal display (LCD) market. With development of thin film transistor process, the TFT-LCD has become a popular product in the current LCD market. FIG. 1 is an equivalent circuit diagram of sub pixel of an existing panel, which comprises gate line Gn, data line D, TFT, parasitic capacitor Cgd between gate and drain of TFT, parasitic capacitor Cgs between gate and source, parasitic capacitor Cds between drain and source, two terminals of the liquid crystal capacitor C1*c* are respectively connected to a common electrode C and a pixel electrode P, and one terminal of the storage capacitor Cs is connected to the pixel electrode P and the other terminal is connected to the next gate line Gn+1.

With a broadly adopted architecture at present where a common electrode voltage VCOM is fixed, when a voltage on gate line varies, correctness of voltage on pixel electrode is affected by a parasitic capacity Cgd between the gate and the drain such that a DC component-coupling voltage is applied on the pixel electrode, thus because of characteristics of liquid crystal molecules, after a TFT-LCD drives specific still image for a long while, the pixel electrode is applied with a DC component for a long while, then graph of the previous image will not leave when transforming to another images, which makes an image sticking. The reason for the image sticking generation is presence of a coupling voltage, which cause non-symmetry for positive/negative polarity of a pixel electrode voltage.

FIG. 2 is a waveform diagram illustrating the change of real pixel electrode voltage, which reflects pixel electrode voltage change due to effect of a coupling voltage, wherein Vg is a gate voltage, Vp is a pixel electrode voltage, VCOM denoted by solid line is a real VCOM value, dashed line is an ideal pixel electrode voltage without coupling voltage, solid line is a real pixel electrode voltage due to influence of a coupling voltage, and VCOM denoted by solid line is a real common electrode voltage applied upon the common electrode. As illustrated by FIG. 2, positive/negative polarity of the real pixel electrode voltage is not symmetrical with respect to the real common electrode voltage due to presence of the coupling voltage, and VCOM denoted by the dashed line is an ideal common electrode voltage which can make the positive/negative polarity of the real pixel electrode voltage symmetric.

When a gate of a TFT on the panel is turned on, a coupling voltage could be generated on a pixel electrode. Since a source and a drain of the TFT are turned on, a source driver would begin to charge the pixel electrode, then charges on the parasitic capacity Cgd, the storage capacitor Cs and the liquid crystal capacitor C1*c* can be maintained by applying with a voltage on the source. Therefore, even if the pixel electrode voltage is not correct at the beginning (due to effect of the coupling voltage), the source driver charges the pixel electrode voltage to a correct voltage, such that no substantial impact is generated. When the gate of the TFT is turned off, however, no current source provides charges for the parasitic capacity Cgd, the storage capacitor Cs and the liquid crystal capacitor C1*c*, and the source driver has stopped charging the pixel electrode, such that the charges on those three capacitors are re-distributed (capacitors Cgs and Cds are not involved in the above charge re-distribution since one terminal of them is connected with the source of the TFT). A voltage drop (30-40 Volts) generated when a gate driver is turned off is fed back onto the pixel electrode via the parasitic capacity Cgd, such that a voltage drop as to a coupling voltage is generated with respect to the pixel electrode voltage, and thus correctness of gray scale displaying could be influenced. And such a coupling voltage behaves in a way not same with that of the coupling voltage generated when a gate line is turned on which only makes an impact once, and the voltage drop of such a coupling voltage would continue to influence the pixel electrode voltage till the gate driver is turned on again for the next time since the source driver has stopped charging/discharging the pixel electrode. Therefore, human's eye can easily sense the influence made by the coupling voltage onto gray scale of a displaying image.

With respect to a current design employing a fixed common electrode voltage, the coupling voltage would introduce non-symmetry as to positive/negative areas of the pixel electrode voltage (it is a positive polarity if Vp>VCOM, a negative polarity if Vp<VCOM), so an image sticking is generated. Even if the real common electrode voltage is adjusted according to a specific coupling voltage generated at a time so as to make it consistent with the ideal value (referring to FIG. 2, the common electrode voltage before adjusting is denoted by the solid line, and the one after adjusting is denoted by the dashed line), there could be a difference between the real common electrode voltage and the ideal value for the next time since the coupling voltage on the panel may vary when a fixed image is displayed on the liquid crystal panel for a long while or the panel stays in an environment with high humidity and high temperature, and the image sticking may be generated as well. Therefore, if only one fixed common electrode voltage is inputted or the real common electrode voltage is adjusted according to a specific coupling voltage generated at a time, there is a difference between the real common electrode voltage and the ideal common electrode voltage and the influence of the coupling voltage can not be removed, such that the image sticking is generated.

DISCLOSURE OF INVENTION

An object of the present invention provides a method and a device for avoiding image sticking, which are used to resolve the image sticking problem in the prior art in order to realize dynamically adjusting common electrode voltage to be consistent with an ideal value thereby avoiding image sticking generation.

The first aspect of the present invention provides following technical solution by some embodiments:

A method for avoiding image sticking, characterized in comprising following steps:

step 1: generating a bias voltage between a real common electrode voltage applied to a common electrode and an ideal common electrode voltage according to a real pixel electrode voltage, wherein said real pixel electrode voltage is a positive voltage and a negative voltage on a pixel electrode with respect to a common electrode voltage, said ideal common electrode voltage is a voltage which makes the positive voltage and the negative voltage of said real pixel electrode voltage symmetrical;

step 2: adjusting the real common electrode voltage according to said bias voltage to make it consistent with the ideal common electrode voltage.

The second aspect of the present invention provides a following technical solution by some further embodiments:

a device for avoiding image sticking, characterized in comprising:

a bias voltage generation block for generating a bias voltage between a real common electrode voltage and an ideal common electrode voltage according to a real pixel electrode voltage acquired by a data line on a panel which is fed back to a source driving integrated chip;

an adjusting block connected with said bias voltage generation block, for adjusting the real common electrode voltage to make it consistent with the ideal common electrode voltage.

Embodiments according to the first aspect of the present invention and those according to the second aspect of the present invention continuously compare an ideal common electrode voltage and a real common electrode voltage, and dynamically adjust the real common electrode voltage value according to a bias voltage between the real common electrode voltage and the ideal common electrode voltage in order to keep it consistent with the ideal value, thereby eliminating influence of coupling voltage, reducing image sticking and improving image quality.

The technical solutions of the present will be described in detail hereafter in connection with the accompanying figures and embodiments.

BEST MODE TO CARRY OUT THE INVENTION

Figure 1:
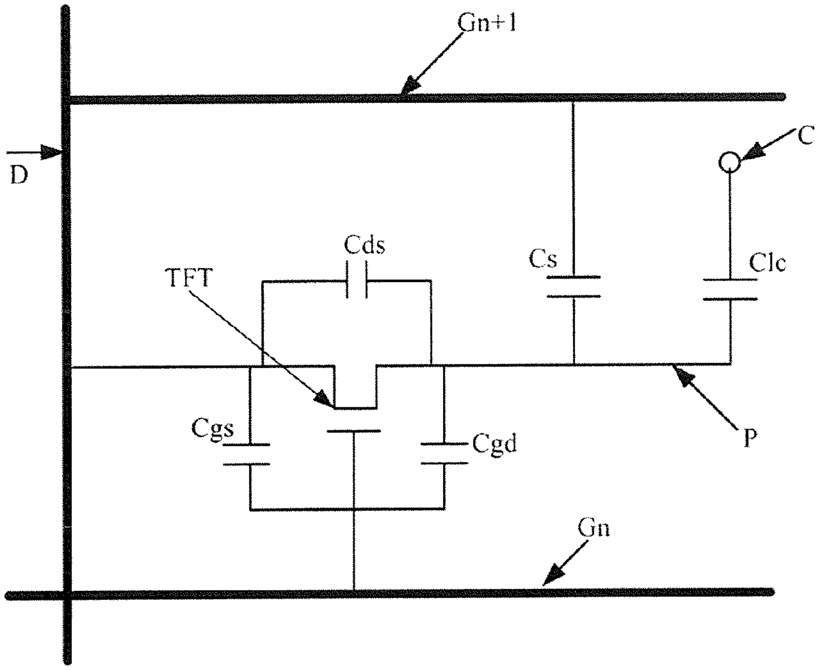
FIG. 1 is an equivalent circuit diagram of a sub-pixel of an existing panel.
Figure 2:
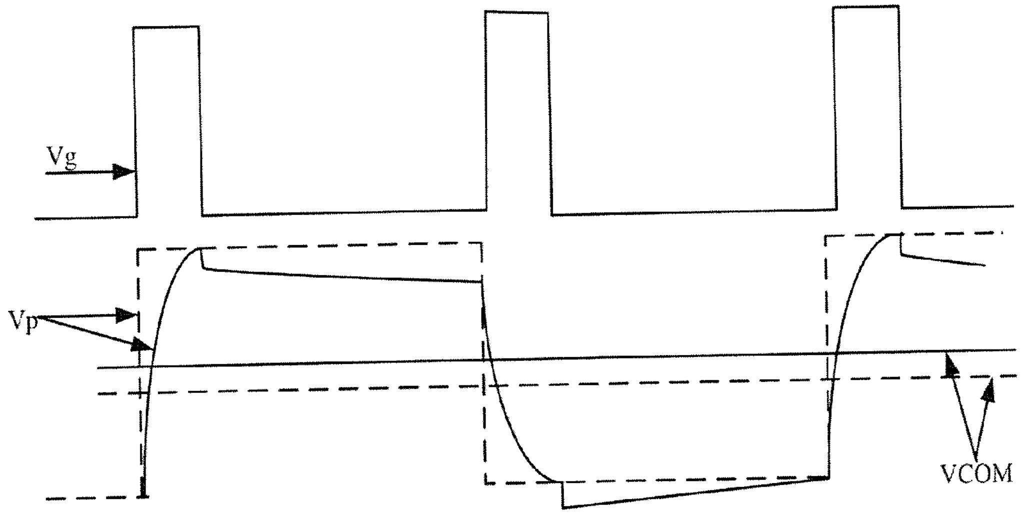
FIG. 2 is a waveform diagram illustrating the change of real pixel electrode voltage.
Figure 3:
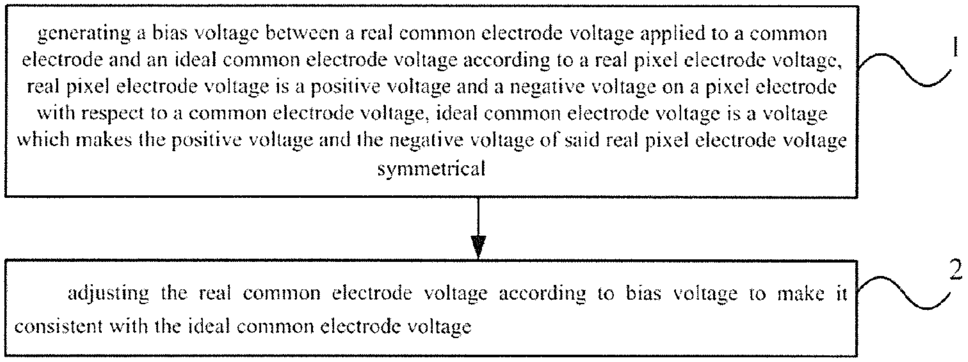
FIG. 3 is a flowchart of the first embodiment of the method for avoiding image sticking according to the present invention.

As shown in FIG. 3 which is a flowchart of the first embodiment of the method for avoiding image sticking according to the present invention. A method for avoiding image sticking comprises:

step 1: generating a bias voltage between a real common electrode voltage applied to a common electrode and an ideal common electrode voltage according to a real pixel electrode voltage, wherein said real pixel electrode voltage is a positive voltage and a negative voltage on a pixel electrode with respect to a common electrode voltage, said ideal common electrode voltage is a voltage which makes the positive voltage and the negative voltage of said real pixel electrode voltage symmetrical;

step 2: adjusting the real common electrode voltage according to said bias voltage to make it consistent with the ideal common electrode voltage.

This embodiment makes the real common electrode voltage consistent with the ideal common electrode voltage by comparing the real common electrode voltage consistent with the ideal common electrode voltage and adjusting the real common electrode voltage, and image sticking can be alleviated or avoided.

Figure 4:
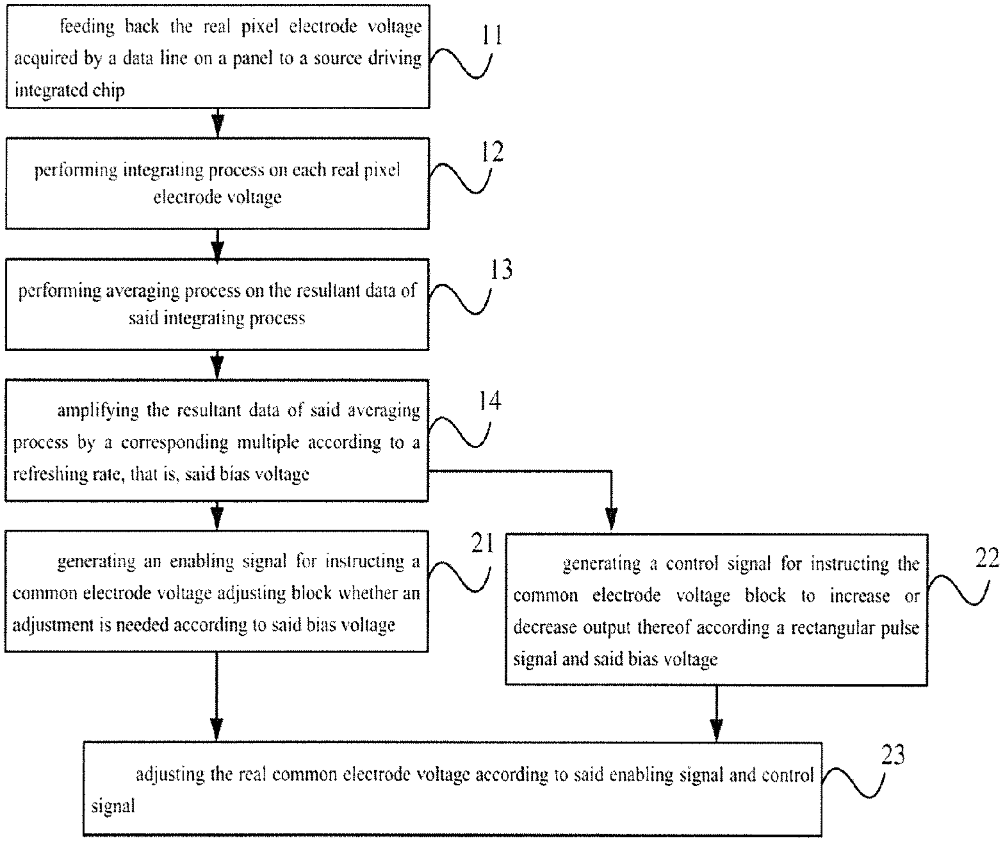
FIG. 4 is a flowchart of the second embodiment of the method for avoiding image sticking according to the present invention.
Figure 5:
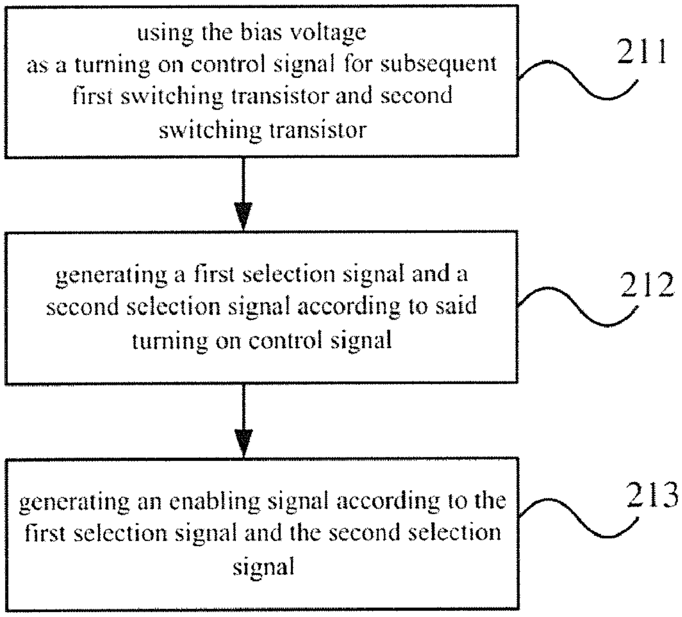
FIG. 5 is a flowchart of step 21 in the second embodiment of the method for avoiding image sticking according to the present invention.
Figure 6:
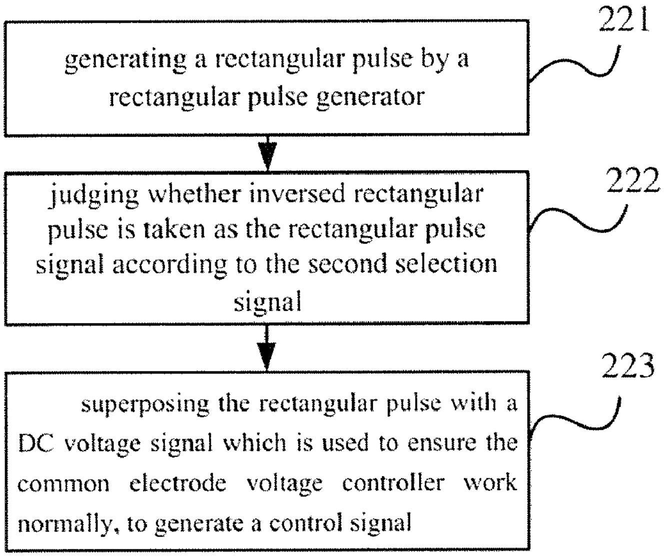
FIG. 6 is a flowchart of step 22 in the second embodiment of the method for avoiding image sticking according to the present invention.

As shown in FIG. 4 which is a flowchart of the second embodiment of the method for avoiding image sticking according to the present invention. A method for avoiding image sticking comprises:

step 11: feeding the real pixel electrode voltage acquired by a data line on a panel back to a source driving integrated chip in order to complete data acquisition, to provide input data for computing the bias voltage, where number of data lines is determined based on real situation, and the number is larger, an average number is finer with possible aperture ratio drop;

step 12: performing integrating process on each said real pixel electrode voltage; according to integrator principle, the resultant value of integration of each integrator is A times of bias voltage between the real common electrode voltage of pixel corresponding to that integrator and the ideal common electrode voltage, A=1/refreshing rate (a specific value for times A is associated with a refreshing rate, a generic refreshing rate is between 60 Hz and 77 Hz, thus times value A is a number between $1/77$ and $1/60$);

step 13: averaging the resultant data of the above integration (A times of bias voltage for respective pixel) to generate the average number, i.e. A times of said bias voltage (A is larger than $1/77$ and less than $1/60$), the purpose of the averaging is to make all pixel points on an entire panel optimally adjusted as a whole;

step 14: using amplifier to amplify the resultant data of the above averaging (A times of the bias voltage) by 1/A times to thus generate the bias voltage between the real common electrode voltage and the ideal common electrode voltage;

step 21: generating an enabling signal according to the bias voltage, to indicate whether the real common electrode voltage needs to be adjusted:

step 22: generating a control signal according to a rectangular pulse and the bias voltage, to indicate whether to increase or decrease the real common electrode voltage;

step 23: taking the enabling signal and the control signal as an input of common electrode voltage adjustment, adjusting the real common electrode voltage according to said enabling signal and control signal As shown in FIG. 5 which is a flowchart of step 21 in the second embodiment of the method for avoiding image sticking according to the present invention. In this embodiment, step 21 may comprise:

step 211: taking the bias voltage between the real common electrode voltage and the ideal common electrode voltage generated as a turning on control signal;

step 212: generating a first selection signal S1 with high level and a second selection signal S2 with low level when voltage value of said turning on control signal is larger than positive threshold voltage; generating the first selection signal S1 with low level and the second selection signal S2 with high level when the voltage value of said turning on control signal is less than negative threshold voltage; otherwise, generating the first selection signal S1 with low level and the second selection signal S2 with low level;

step 213: generating the enabling signal CE with low level when both of the first selection signal and the second selection signal are low level; otherwise, generating the enabling signal CE with high level;

As shown in FIG. 6 which is a flowchart of step 22 in the second embodiment of the method for avoiding image sticking according to the present invention. In this embodiment, step 22 may comprise:

step 221: generating a rectangular pulse by a rectangular pulse generator;

step 222: taking said rectangular pulse as a rectangular pulse signal (S3) when said second selection signal (S2) is high level; performing inversion process on said rectangular pulse and taking the said resultant rectangular pulse of inversion process as the rectangular pulse signal (S3) when said second selection signal (S2) is low level;

step 223: superposing said signal (S3) with a DC voltage signal (DVDD/2) which ensures common electrode voltage controller to work normally, thereby generating a control signal (CTL).

Figure 7:
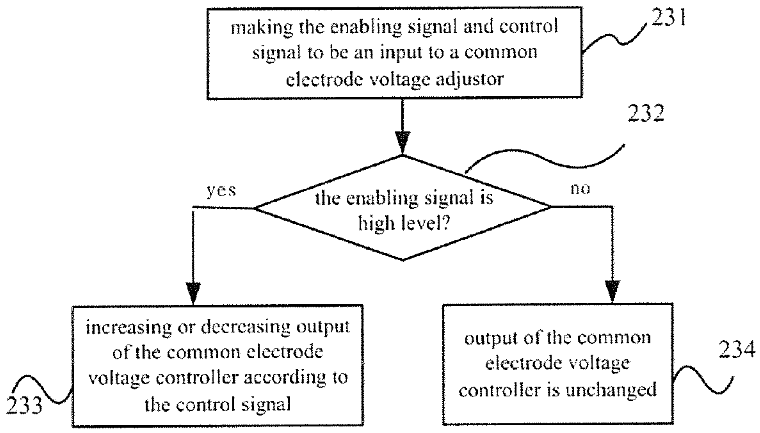
FIG. 7 is a flowchart of step 23 in the second embodiment of the method for avoiding image sticking according to the present invention.

As shown in FIG. 7 which is a flowchart of step 23 in the second embodiment of the method for avoiding image sticking according to the present invention. In this embodiment, step 23 may comprise:

step 231: taking said enabling signal and said control signal as an input of the common electrode voltage controller;

step 232: performing step 233 when said enabling signal is high level, or performing step 234 when said enabling signal is low level;

step 233: increasing output of said common electrode voltage controller when said control signal is a pulse in positive direction, and decreasing output of said common electrode voltage controller when said control signal is a pulse in negative direction;

step 234: keeping output of said common electrode voltage controller unchanged.

Figure 8:
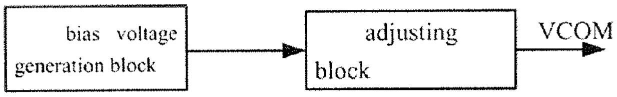
FIG. 8 is a structure diagram of the first embodiment of the device for avoiding image sticking according to the present invention.

As shown in FIG. 8 which is a structure diagram of the first embodiment of the device for avoiding image sticking according to the present invention. The device for avoiding image sticking comprising: a bias voltage generation block and an adjusting block connected with said bias voltage generation block. The bias voltage generation block is for generating a bias voltage between a real common electrode voltage and an ideal common electrode voltage, and the adjusting block is for adjusting the real common electrode voltage VCOM according to the bias voltage.

Figure 9:
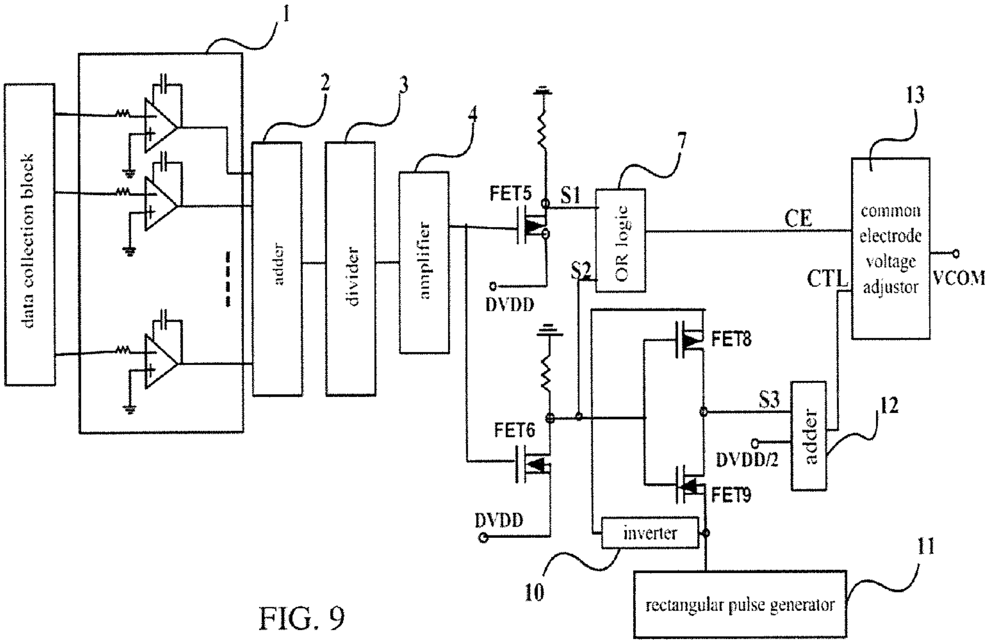
FIG. 9 is a structure diagram of the second embodiment of the device for avoiding image sticking according to the present invention.

As shown in FIG. 9 which is a structure diagram of the second embodiment of the device for avoiding image sticking according to the present invention. The device for avoiding image sticking comprising: a data collection block, an inversion integrator group 1, an adder 2, a divider 3, an amplifier 4, an enabling block, a control block, and a common electrode voltage adjustor 13 connected in sequence.

When acquiring data, 10 data lines D in the middle of panel are selected, the acquired data is fed back to inside of source driving integrated chip (S-DI) via wiring on the panel, where inversion integrator group 1, adder 2 and divider 3 are integrated inside of the source driving integrated chip, the acquired 10 data is output as input of the inversion integrator group 1 then subject to the adder 2 and the divider 3 (divided by 10) so as to obtain average value of the 10 sample data; because integration process is adopted, the result bias voltage at this time should be a times value between $\frac{1}{77}$ and $\frac{1}{60}$ of the real bias voltage (a times value determined according to refreshing rate), therefore, amplification is needed in order to obtain the bias voltage between the real common electrode voltage and the ideal common electrode voltage, amplifier 4 amplifies the average value by 60 to 77 times (which is determined by the adopted refreshing rate in real).

Figure 10:
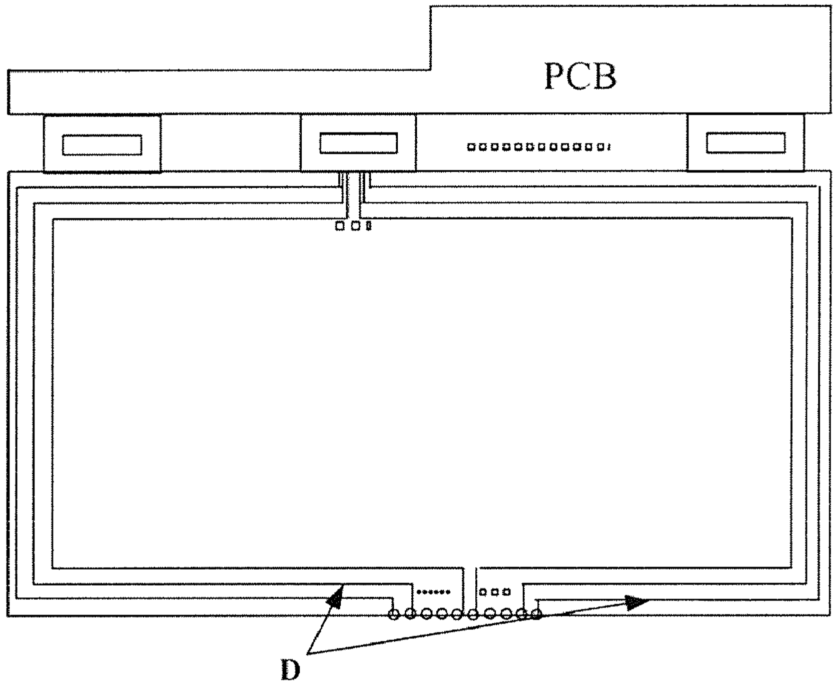
FIG. 10 is a diagram of sampling data from the panel according to the present invention.

When performing data sampling on a panel, PLG wire needs to be added on the panel, data output of a sampling point is fed back to input terminal of integrator on print circuit board (PCB), and ideally the sampling points should be chosen in the center location of the panel since flicker is most obvious at such location. However, feed back PLG with such a design can cause aperture ratio to drop, so the present patent application chooses the middle location on the lower part of the panel (see FIG. 10). Thus, PLD wire becomes longer, resistant becomes bigger, thereby delay of the sampling point data is increased such that there is certain difference between sampled data and real value. Nevertheless, the data feedback from the panel to the source driver can be realized by using flexible print circuit (FPC). If FPC is used, then more data sampling points can be chosen thus the resultant difference of integration can be more precise.

The enabling block comprises a P type field effect transistor FET5, a N type field effect transistor FET6, and an OR logic 7, gates of FET5 and FET6 are connected to output of the amplifier 4, drain of FET5 and source of FET6 are connected to a DC voltage DVDD, the DVDD is a digital power supply set up on PCB, source of FET5 and drain of FET6 are grounded via load, the addition of DC power supply and grounding are condition for ensuring a field effect transistor to work normally, source of FET5 acts as output terminal, its output signal, i.e. selection signal S1, acts as an input signal of the OR logic 7, drain of FET6 acts as output terminal, its output signal, i.e. selection signal S2, acts as another input signal of the OR logic 7, and output signal of the OR logic 7 is the enabling signal CE which is one of input signals to the digital common electrode voltage controller 13.

The bias voltage between the real common electrode voltage and the ideal common electrode voltage output by the amplifier 4 is used as gate turning on control signal of the field effect transistors FET5 and FET6, the absolute value of threshold voltage of both is 0.1 V, wherein, FET5 is a P type field effect transistor which is turned on when voltage between its gate and source Vgs is larger its threshold voltage (0.1 V) or turned off otherwise. FET6 is a N type field effect transistor which is turned on when voltage between its gate and source is less than its threshold voltage (−0.1 V) or turned off otherwise; that is, when the real common electrode voltage is less than the ideal common electrode voltage by 0.1 V or more (real VCOM−ideal VCOM<−0.1 V), FET6 is turned on, the selection signal S2 is high level "1", FET5 is turned on, the selection signal S1 is low level "0", the selection signal S1 and the selection signal S2 become high level "1" output after going through the OR logic 7, i.e. the enabling signal CE of the digital common electrode controllers is "1"; when the real common electrode voltage is higher than the ideal common electrode voltage by 0.1 or more (real VCOM−ideal VCOM>0.1 V), FET5 is turned on and outputs the selection signal S1 with high level "1", FET6 is turned off and outputs the selection signal S2 with low level "0", the resultant output signal CE after both going through the OR logic 7 is high level "1" as well; in both of the above cases, the common electrode voltage needs to be adjusted; when different between the real common electrode voltage and the ideal common electrode voltage is less than 0.1 V, both of FET5 and FET6 are turned off, both of the signals S1 and S2 are low level "0", the CE output from the OR logic 7 is low level "0", at this time, no adjustment is made upon the common electrode voltage; the reason that the adjustment is only made when the difference is bigger than 0.1 V as described above is that flicker is prone to happening if adjustment is made when the difference is small; the switching circuit using field effect transistors has certain delay which helps to reduce flicker to some degree, and is low cost.

The control block comprises a P type field effect transistor FET8, a N type field effect transistor FET9, an inverter 10, a rectangular pulse generator 11, and an adder 12, gates of FET8 and FET9 is connected with output terminal of FET6, i.e. the selection signal S2 is gate turning on control signal of FET8 and FET9, drains of FET8 and FET9 are connected together to acts as output terminal, output signal of which is a rectangular pulse signal S3, source of FET8 is connected to the rectangular pulse generator 11 via the inverter 10, source of FET9 is directly connected to the rectangular pulse generator 11, one input signal to the adder 12 is the rectangular pulse signal S34 and the other input signal is DC voltage signal DVDD/2, DVDD/2 is determined according to the middle value of control signal which the common electrode voltage controller requires it to input, the adder 12 is connected with the digital common electrode voltage controller 13 and its output signal is control signal CTL being another input signal for the digital common electrode voltage controller 13.

When the selection signal S2 output by FET6 is high level "1" (real VCOM is less than ideal VCOM by 0.1 V or more), FET9 is turn on, FET8 is turned off, rectangular pulse generated by the rectangular pulse generator 11 is input as the rectangular pulse signal S3 to the adder 12 via FET9, another input of the adder 12 is DC voltage signal DVDD/2, the resultant signal by superposing the both signals is the digital common electrode voltage control signal CTL; when the selection signal S2 is low level "0" (real VCOM is higher than ideal VCOM by 0.1 V or more), FET9 is turned off, FET8 is turned on, the rectangular pulse generator obtains a rectangular pulse in negative direction via the inverter 10 and FET8, the pulse acts as the rectangular pulse signal S3 to overlap with DC voltage DVDD/2 to obtain the control signal CTL.

Figure 11:
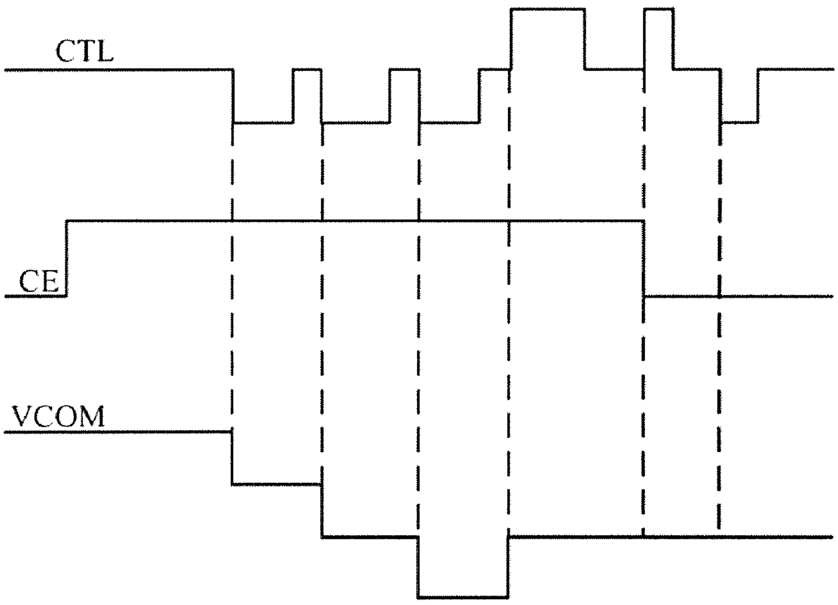
FIG. 11 is an embodied waveform diagram of step 23 in the second embodiment of the method for avoiding image sticking according to the present invention.

The output signal CE of the enabling block and the output signal CTL of the control block are used as output of the digital common electrode voltage adjustor 13 to adjust the common electrode voltage in real time, and the output of the common electrode voltage adjustor 13 is the real common electrode voltage VCOM adjusted dynamically; FIG. 11 shows a waveform illustrating that VCOM is adjusted by the CE and the CTL. When the CE is high level, i.e. when the difference between the ideal VCOM and the real VCOM is bigger than 0.1 V, the change of CTL becomes effcted: when the CTL is a pulse in positive direction, as explained above, the real VCOM at this time is lower than the ideal VCOM, so the output of VCOM increases; when the CTL is a pulse in negative direction, the real VCOM at this time is higher than the ideal VCOM, so the output of VCOM decreases; when the CE is low level, i.e. when the difference between the ideal VCOM and the real VCOM is less than 0.1 V, no adjustment is made to the VCOM.

At last, it should be understood that the above embodiment is used to explain the technical solutions of the present invention thus does not limit the scope thereof; although the present invention is described by making reference to the embodiments above, a person having ordinary skill in the art should understand various amendments and changes can be made to the technical solutions of the embodiments as described above, or equivalent substitutes can be used in place of some specific technical features therein without departing from the spirit and scope of the disclosure as defined by the appended claims and/or equivalents.

I claim:

1. A method for avoiding image sticking, characterized in comprising following steps:

step 1: generating a bias voltage between a real common electrode voltage applied to a common electrode and an ideal common electrode voltage according to a real pixel electrode voltage, wherein said real pixel electrode voltage is a positive voltage or a negative voltage on a pixel electrode with respect to a common electrode voltage, said ideal common electrode voltage is a voltage which makes the positive voltage and the negative voltage of said real pixel electrode voltage symmetrical wherein said step is effected by;

step 11: feeding back the real pixel electrode voltage acquired by a data line on a panel to a source driving integrated chip;

step 12: performing integrating process on each said real pixel electrode voltage;

step 13: performing averaging process on the resultant data of said integrating process; and step 14: amplifying the resultant data of said averaging process by a corresponding multiple according to a refreshing rate, to obtain said bias voltage; and step 2: adjusting the real common electrode voltage according to said bias voltage to make it consistent with the ideal common electrode voltage.

2. The method for avoiding image sticking of claim 1, characterized in that said step 2 comprises:

step 21: generating an enabling signal for instructing a common electrode voltage adjustor whether an adjustment is needed according to said bias voltage;

step 22: generating a control signal for instructing the common electrode voltage adjustor to increase or decrease output thereof according a rectangular pulse signal and said bias voltage; and step 23: adjusting the real common electrode voltage as output of the common electrode voltage adjustor, according to said enabling signal and control signal.

3. The method for avoiding image sticking of claim 2, characterized in that said step 21 comprises:

step 211: using the bias voltage generated by the step 1 as a turning on control signal for subsequent first switching transistor and second switching transistor;

step 212: generating a first selection signal and a second selection signal according to said turning on control signal;

step 213: generating an enabling signal according to the first selection signal and the second selection signal.

4. The method for avoiding image sticking of claim 3, characterized in that said step 22 comprises:

step 221: generating the rectangular pulse by a rectangular pulse generator;

step 222: judging whether inversed rectangular pulse is taken as the rectangular pulse signal according to the second selection signal; and step 223: superposing the rectangular pulse with a DC voltage signal which is used to ensure the common electrode voltage controller work normally, to generate a control signal.

5. The method for avoiding image sticking of claim 2, characterized in that said step 23 comprises:

step 231: making said enabling signal and control signal to be an input to the common electrode voltage adjustor;

step 232: performing step 233 when said enabling signal is high level, or performing step 234 when said enabling signal is low level;

step 233: increasing or decreasing output of the common electrode voltage controller according to the control signal;

step 234: keeping output of said common electrode voltage adjustor unchanged.

6. A device for avoiding image sticking, characterized in comprising:

a) a bias voltage generation block for generating a bias voltage between a real common electrode voltage and an ideal common electrode voltage according to a real pixel electrode voltage acquired by a data line on a panel which is fed back to a source driving integrated chip, which bias generation block comprises:

i) a data collection block for feeding the pixel electrode voltage acquired by the data line on the panel back to inside of the source driving integrated chip;

ii) an inversion integrator group for performing integrating process on said pixel electrode voltage, input terminal of which connecting to output terminal of said data collection block;

iii) an adder and a divider, an input terminal of said adder connecting to output terminal of said inversion integrator group, output terminal of said adder connecting to the divider, output terminal of said divider connecting to an amplifier, said adder, divider and amplifier being for calculating an average value of said difference voltage and performing averaging process on the resultant data of said integrating process; and iv) an amplifier, an input terminal of which connecting to the output terminal of said divider, for amplifying according to a refresh rate the resultant data of said averaging process to obtain said bias voltage between a real common electrode voltage and an ideal common electrode voltage; and b) an adjusting block connected with said bias voltage generation block, for adjusting the real common electrode voltage to make it consistent with the ideal common electrode voltage.

7. The device for avoiding image sticking of claim 6, characterized in that said adjusting block comprises:

an enabling block connected with said bias voltage generation block and for generating an enabling signal indicating whether a common electrode voltage adjustor needs to adjust the real common electrode voltage;

a control block connected with said enabling block and for generating a control signal to instruct the common electrode voltage adjustor to increase or decrease the real common electrode voltage; and the common electrode voltage adjustor connected with said enabling block and said control block and for adjusting the real common electrode voltage according to said enabling signal and control signal.

8. The device for avoiding image sticking of claim 7, characterized in that said enabling block comprises:

a first switching transistor and a second switching transistor, both of the first switching transistor and the second switching transistor connecting with said bias voltage generation block, the first switching transistor is a P type field effect transistor, the second switching transistor is a N type field effect transistor, drain of the first switching transistor and the second switching transistor are both connected to a digital power supply located on a print circuit board, source of the first switching transistor and drain of the second switching transistor are both grounded via load, to ensure both of them can work normally, gates of the first switching transistor and the second switching transistor are both connected to the amplifier and fed with said turning on control signal as a turning on control signal; and an OR logic, one input terminal of which is connected to the source of the first switching transistor, the other input terminal is connected to the drain of the second switching transistor, output signal of the OR logic is said enabling signal.

9. The device for avoiding image sticking of claim 8, characterized in that said control block comprises:

a rectangular pulse generator for generating a rectangular pulse;

a third switching transistor and a forth switching transistor, the third switching transistor is a P type field effect transistor, the forth switching transistor is a N type field effect transistor, drains of the third switching transistor and the forth switching transistor are connected together, gates of the third switching transistor and the forth switching are connected to the drain of the second switching transistor, source of the forth switching transistor is connected to the rectangular pulse generator, source of the third switching transistor is connected to the rectangular pulse generator via an inverter; and an adder, one input terminal of which is connected with a DC voltage signal which is used to ensure said common electrode voltage controller work normally, the other input terminal is connected to the drains of the third switching transistor and the forth switching transistor, output of the adder is said control signal.

* * * * *